US009356897B1

(12) United States Patent
Cantu, II

(10) Patent No.: US 9,356,897 B1
(45) Date of Patent: *May 31, 2016

(54) SYSTEMS AND METHODS FOR A PROVIDER INITIALIZED REAL-TIME CHAT BASED ON DETECTION OF A PATTERN

(71) Applicant: United Services Automobile Association, San Antonio, TX (US)

(72) Inventor: Jose J. Cantu, II, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,584

(22) Filed: Jun. 23, 2014

Related U.S. Application Data

(63) Continuation of application No. 11/759,724, filed on Jun. 7, 2007, now Pat. No. 8,787,556.

(51) Int. Cl.
*H04M 3/00* (2006.01)
*H04M 5/00* (2006.01)
*H04L 12/58* (2006.01)
*G06F 3/0484* (2013.01)
*H04M 3/51* (2006.01)

(52) U.S. Cl.
CPC .............. *H04L 51/10* (2013.01); *G06F 3/0484* (2013.01); *H04M 3/5183* (2013.01); *H04M 3/5191* (2013.01)

(58) Field of Classification Search
CPC ........ G06Q 10/06; H04M 3/323; H04M 3/36; H04M 3/4285; H04M 3/42195; H04M 3/493; H04M 3/51; H04M 3/5166; H04M 3/5175; H04M 3/5183; H04M 3/523; H04M 3/5231; H04M 3/5232; H04M 5/5233; H04M 5/5237; H04M 3/5238; H04M 2203/2011; H04M 2203/2061; H04M 2242/00; H04M 2242/08; H04M 2242/12

USPC ............. 379/265.02, 265.09, 265.11, 265.01, 379/265.03, 265.04, 265.05, 265.06, 379/265.07, 265.08, 265.1, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

2001/0054064 A1* 12/2001 Kannan ............. G06F 17/30867
709/203
2002/0046053 A1 4/2002 Hare et al.
(Continued)

OTHER PUBLICATIONS

"Beyond the Search—Five Ways to Boost Web Traffic Conversion Rates", [online]. [archived on Dec. 15, 2005]. Retrieved from the Internet: <URL: http://web.archive.org/web/20051215060313/ http://www.liveperson.com/docs/whitepapers/BeyondtheSearch. pdf>, 10 pgs.
(Continued)

*Primary Examiner* — Khai N Nguyen
(74) *Attorney, Agent, or Firm* — Eric L. Sophir; Dentons US LLP

(57) ABSTRACT

In one example, a method provides at least one service to a web-enabled user by detecting a stalled web session related to the user accessing the at least one service and providing a stall alert to a computer telephony interface, the stall alert based on the stalled web session. In response to the stall alert, the method includes using a computer telephony interface to automatically query availability of an agent. If the query determines an agent is available, the method includes automatically communicating instructions from a real-time chat module in communication with the computer telephony interface to a computing device operated by the user, the instructions to initialize a real-time chat application executed on the computing device. The method includes providing the agent with outbound call specifications related to the user and disabling the stall alert when the stalled web session is no longer detected.

26 Claims, 10 Drawing Sheets

(56) References Cited

U.S. PATENT DOCUMENTS

| | | | |
|---|---|---|---|
| 2003/0126095 A1* | 7/2003 | Allen | G06Q 50/188 705/80 |
| 2004/0042612 A1 | 3/2004 | Michelson et al. | |
| 2004/0068431 A1 | 4/2004 | Smith et al. | |
| 2006/0093123 A1 | 5/2006 | Becerra et al. | |
| 2006/0178918 A1* | 8/2006 | Mikurak | G06Q 10/06 705/7.25 |
| 2006/0245580 A1 | 11/2006 | Hein et al. | |
| 2007/0019800 A1 | 1/2007 | Bushey et al. | |
| 2007/0078697 A1 | 4/2007 | Nixon | |
| 2007/0282699 A1 | 12/2007 | Kumar et al. | |
| 2008/0175174 A1* | 7/2008 | Altberg | G06Q 30/02 370/259 |
| 2008/0240401 A1 | 10/2008 | Mergen et al. | |

OTHER PUBLICATIONS

"Liveperson—Timpani Sales & Marketing—Engage and Connect With Online Visitors", [online]. [retrieved on May 22, 2007]. Retrieved from the Internet: <URL: http://www.liveperson.com/enterprise/sales-marketing/solution-overview.asp>, 1 pg.

"LivePerson Pro", [online]. [archived Mar. 7, 2006]. Retrieved from the Internet: <URL: http://web.archive.org/web/20060307072545/http://wvvw.liveperson.com/docs/datasheets/LP_DS_LivePersonPro.pdf>, 2 pgs.

"LivePerson Pro—Help Your Online Visitors Find What They Need, Before They Get Frustrated and Leave Your Site", [online]. [retrieved on May 22, 2007]. Retrieved from the Internet: <URL: http://www.liveperson.com/sb/sb_chat.asp>, 2 pgs.

"Salesmanship Comes to the Online Stores, but Please Call it a Chat", [online]. Aug. 7, 2006, The New York Times. [retrieved on May 22, 2007]. Retrieved from the Internet: http://www_nytimes.com/2006/08/07/technology/07ecom.html?ex=1312603200&en=4c714c2da9Oddc52&ei=5089&partner=rssyahoo&emc=rss>, 3 pgs._.

"Timpani Sales and Marketing—Maximize Online Revenue Opportunities by Proactively Engaging the Right Visitor at the Right Time", [online]. [archived on Feb. 12, 2006]. Retrieved from the Internet: <URL: http://www,tympani_com/docs/datasheets/LP SS Timpani_Sales&Mktg.pdf>, 4 pgs.

* cited by examiner

SYSTEMS AND METHODS FOR A PROVIDER INITIALIZED REAL-TIME CHAT BASED ON DETECTION OF A PATTERN

RELATED APPLICATIONS

This application is a continuation of U.S. patent application Ser. No. 11/759,724, filed Jun. 7, 2007, now U.S. Pat. No. 8,787,556, entitled "SYSTEMS AND METHODS FOR A PROVIDER INITIALIZED REAL-TIME CHAT BASED ON DETECTION OF A PATTERN," which is hereby incorporated by reference in its entirety. The present application is also related to U.S. patent application Ser. No. 11/759,697, filed Jun. 7, 2007, entitled "METHOD AND APPARATUS FOR A PROVIDER TO INITIALIZE A CHAT UPON DETECTION OF A PATTERN", now abandoned and U.S. patent application Ser. No. 11/759,707, filed Jun. 7, 2007, entitled "METHOD AND APPARATUS FOR A PROVIDER TO INITIALIZE A CHAT UPON DETECTION OF A PATTERN", now abandoned, all of which are incorporated herein by reference in their entirety.

TECHNICAL FIELD

This application relates to systems and methods that process communications and more particularly to systems and methods for a provider initialized real-time chat based on detection of a pattern.

BACKGROUND

Service providers must provide improved services to distinguish themselves from new competitors and from new competitive products. Further, users appreciate new services from existing business partners, and will increasingly renew business when they feel they are being provided with increasingly valuable service.

SUMMARY

To better service users, service providers often offer new services. Some of these include improved tools to communicate and store information. As a result, service providers are configuring and operating increasingly complex systems that are capable of delivering integrated services to users. Some service providers deploy and operate large call centers with many agents and many interconnected computers in an effort to deliver integrated services to their users.

These tools can be improved to offer even more solutions. For example, the internet is an excellent medium for providing users with information, and for allowing users to interact with an agent. For example, a user requiring access to information such as insurance information can access a website related to that service. In some instances, a user can use a website to adjust the level of service they are receiving. In additional examples, a user can provide new information to a service provider using the website. It is even possible to offer users new products if you notice that they are shopping but not accessing what might be a preferred service for them. Further, it is possible to address user concerns, sometimes even before they ask for help.

But these offerings can be further enriched when they are augmented with an agent who can assist the users as they are serviced. The examples disclosed here provide tools for enabling a user to receive improved services such as real-time chat. Some examples address user concerns automatically. For example, if a user makes a mistake during an application process required by a service provider, an agent can educate them as to their mistake, in some instances before the user asks for assistance.

In one example, a method provides at least one service to a web-enabled user by detecting a stalled web session related to the user accessing the at least one service and providing a stall alert to a computer telephony interface, the stall alert based on the stalled web session. In response to the stall alert, the method includes using a computer telephony interface to automatically query availability of an agent. If the query determines an agent is available, the method includes automatically communicating instructions from a real-time chat module in communication with the computer telephony interface to a computing device operated by the user, the instructions to initialize a real-time chat application executed on the computing device. The method includes providing the agent with outbound call specifications related to the user and disabling the stall alert when the stalled web session is no longer detected.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Systems

Figure 1:
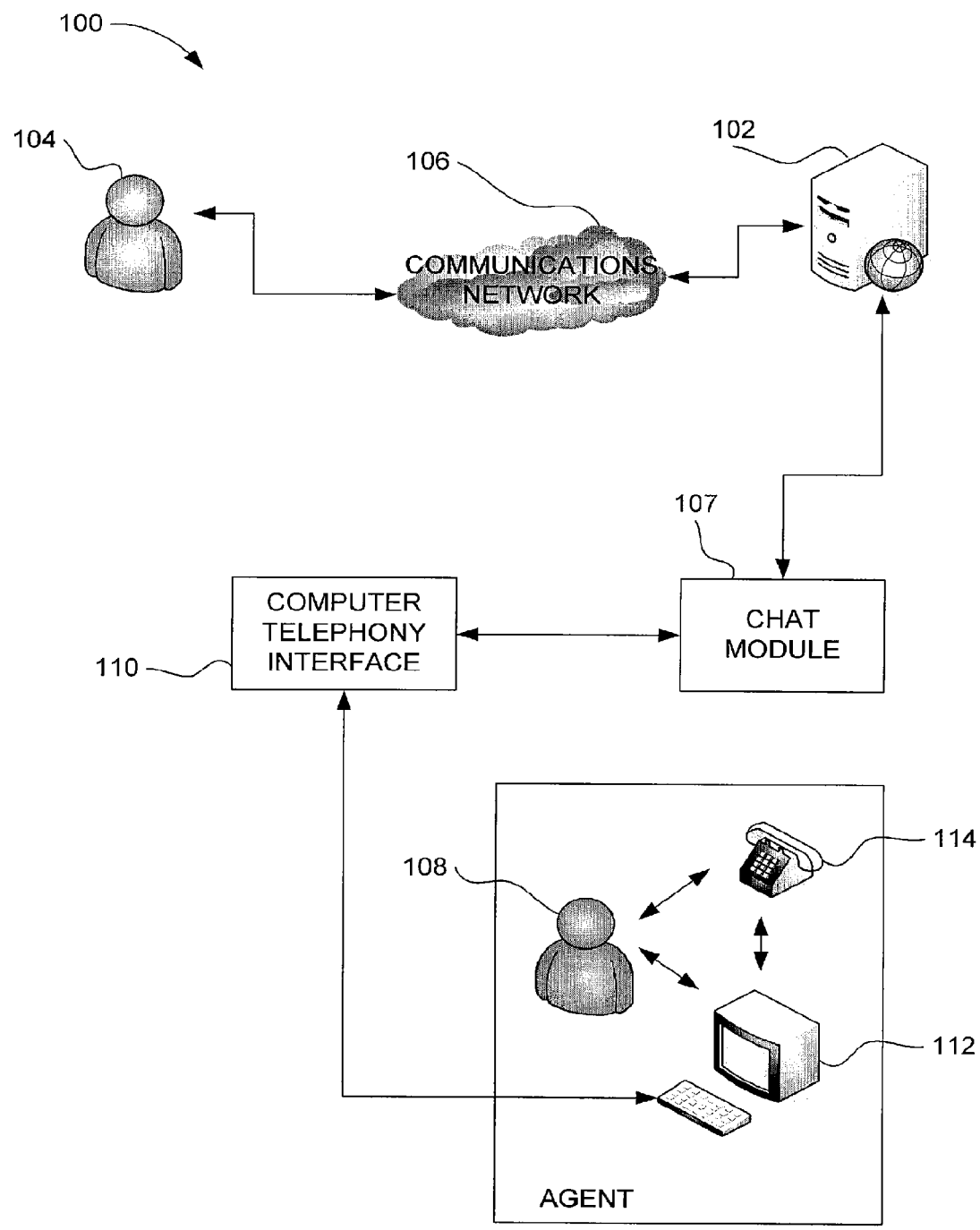
FIG. 1 shows a diagram of a system for establishing a real-time chat between an agent and a user, in accordance with some example embodiments.

FIG. 1 shows a high-level diagram of a system of processing communications received through a communications network, in accordance with some example embodiments. The system 100 includes one or more communications content management modules 102 communicatively coupled to a user 104 through a communications network 106. Various communications networks are contemplated, including, but not limited to, the internet or another network, including additional packet switched networks. Some embodiments use an Internet Protocol (IP) address. An IP address may be a numerical address, such as 169.254.0.1, or a Uniform Resource Location (URL), such as www.home.com, which can be translated by a Domain Name System (DNS) into a numerical address. The numerical address provide as an example for an IP address is an IPv4 address, though this application is not limited to communications over an IPv4 network, and includes any other suitable IP network, such as an IPv6 network, or some combination thereof.

Additionally included are one or more chat modules 107. The chat modules 107 are additionally coupled to one or more agents 108 through a computer telephony interface 110. The one or more agents 108 may interact with the computer telephony interface 110 through an agent system 112 or a telephone interface 114. In various embodiments, the telephone interface 114 is controlled at least partially or at least part of the time by the agent system 112.

The system in this example provides a framework in which a user need can be identified within the system 100. The user need (e.g., to be chatted with) can be serviced by one or more agents communicatively coupled to the computer telephony interface 110. A grouping of agents is collectively known as a call center, in some examples. As used herein, the entity that operates the computer telephony interface and the agents communicatively coupled to the computer telephony interface are described as the operator.

The term chat is used as a short descriptor of an interaction between the user and an agent which resembles chatting over a computer network using typed communication. The term real-time chat refers to communication which attempts to emulate typed communication which has little or no delay between sending and receipt. The term call is used as a descriptor of any voice-based interaction between the user and an agent, or call center system. A real-time chat application, in some embodiments, is executed within a web browser operable on the computing device. In additional embodiments, the real-time chat application is executed in parallel to a web browser. In some of these embodiments, an instant messenger application is run in parallel to a web browser.

In various embodiments, a user accesses a website over the network. The user interacts with the network until one of a plurality of website use patterns are detected, including, but not limited to, a stall or prolonged period of stagnation, accessing one or more websites (e.g., a frequently asked questions website) a plurality of times, reaching a particularly difficult portion of a multi-field or multi-page application, or following any other sort of pattern which corresponds with a predetermined pattern of use. Once a pattern of use is recognized, the system provides various devices to service the user, and further provides various methods of serving the user. Methods and systems of communication not listed here expressly can be included. Some embodiments employ an agent to provide a remedy to a stall or another pattern.

In some examples, a user may log onto a website to pay the balance due on their credit card. One or more systems discussed here monitor their behavior and recognize a pattern, such as a period of inactivity at a particular phase of the payment process. In various examples, periods of inactivity which exceed a specified period of inactivity are recognized. Recognition of a pattern triggers an alert by a device (e.g., a pattern detection module), in various embodiments. The alert can be a flag in a database, for example. The alert can be another alert including, but not limited to, a signal, a voltage change, an audible noise or visible light, or another alert.

The alert is communicated to one or more other devices, such as a computer telephony interface 110. A computer telephony interface is also known as a computer telephony integration. In some examples, the computer telephony interface 110 queries a call center for agent availability. If the agent 108 is available, the call center establishes a chat communication with the user 104 by sending instructions to a computing device of the user which are intended to initialize a chat application. Some examples establish a chat communication with a system 112 of the agent 108 by sending the system of the agent instructions to initialize a chat communication. If the agent was not available, the computer telephony interface could send a chat request to a queue of the agent.

Some embodiments send an invitation to chat to a user and detect a user response to the real-time chat invitation. In some embodiments, sending instructions includes sending instructions only if the user response indicates to initialize the real-time chat application.

In some examples, an agent assists the user by answering questions over the telephone and learns that the user would prefer to transition to an alternative communication medium. In some of these instances, the agent can initiate the system 100 to initialize a chat application on one or both of an agent system and a user system.

In various embodiments, the computer telephony interface 110 manages and routes one or more chat alerts and instructions to chat depending on which agent is available to take a chat request. Operators of the system may seek to reduce the queue time, or the amount of time that the user has to wait to be attended to, by increasing the number of agents and intelligently routing a chat request to an agent who has the least number of pending chat requests or pending calls or other communication requests. Alternatively, the computer telephony interface 110 may queue all chat requests and calls and forward, or route a chat request or call, to an agent when they are available. The agent can than initialize one or more of a chat, a call, or another communication.

In some embodiments, a pattern recognition module can recognize that a user is purchasing services according to a pattern, and can match that pattern to a database which stores unidentified needs which a user might be interested in satisfying with one or more services. For example, a relational database stores the buying habits of user having a specified demographic and offers a chat to the user to sell services which fit their demographic, but which have not been identified by the user. These services may include, without limitation, financial planning, life insurance, homeowner's insurance, automobile insurance, liability insurance, casualty insurance, health insurance, banking services, brokerage services, and the like. Services, in the larger sense, encompass products or services that can enhance the financial stability of the user, in various examples.

The user 104, as discussed above, logs onto a website to have their need taken care of. However, the user 104 may have one or more other needs that should to be addressed. For example, a user may seek to pay a credit card bill and update their billing address. In some embodiments, the chat module 107 can combine either the identified, or present need, of the user with needs that have not been expressed, or unidentified needs. These unidentified needs may also be called future needs, in that the need may be expressed another time advanced from the present user session. In various embodiments, the content management module 102 can be configured to recognize an unexpressed need for the user. The chat module 107 may take information received from a chat and derive a need from it.

By using other information about or related to the user, unidentified needs can be more accurately derived. For instance, when a user logs on to pay an overdue balance on a credit card, the chat module 107 can read the account of the user and note that they are over their credit limit. By combining that information with the identified need to pay the overdue balance, the call telephone interface 110 may derive that the user would find some utility in talking with an agent who is able to also increase their credit limit at the same time. In such an example, the agent that a concurrent communication (e.g., a telephone call) is sent to would be able to receive payment for the overdue balance and take the application for the increase in the credit limit.

Figure 2:
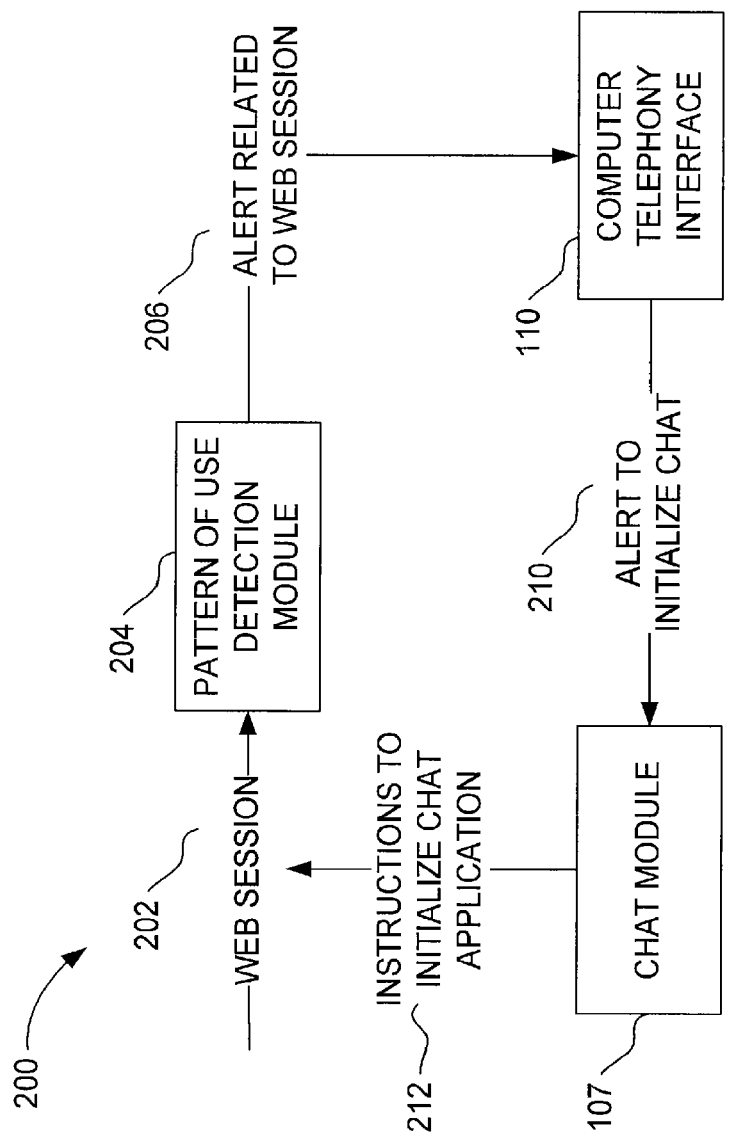
FIG. 2 shows a diagram of an apparatus for establishing communications, in accordance with some example embodiments.

FIG. 2 shows a high-level diagram of an apparatus 200 for processing communications, in accordance with some example embodiments. In various embodiments, a web session 202 is started. In some of these embodiments, this includes the user accessing a content management module (e.g., a web server). In various embodiments, a pattern of use detection module 204 monitors user interaction with the content management module. A pattern of use detection module tracks user activity and compares it to one or more specified patterns to derive information about user behavior. In some embodiments, the pattern of use detection module 204 is a software object on a content management module. In additional embodiments, the pattern of use detection module is another computing device in communication with the content management module. Other device and software based solutions are possible.

In some embodiments, one or more alerts related to the web session 206 are provided. In some embodiments, these alerts are provided to a computer telephony interface 110. In some embodiments, the computer telephony interface manages several system requests, such as queuing agents, linking a user with a service level (e.g., ranking users in a service order based on their level of buying with the service provider), etc. In some embodiments, the computer telephony interface determines that the chat module 107 can manage a chat between an agent and a user and sends an alert to initialize a chat 210 to the chat module 107. The chat module 107, in various embodiments, outputs instructions to initialize a chat application 212. The instructions to initialize a chat application 212 may include application code, such as bytecode or machinecode.

In some embodiments, the chat module 107 receives an alert to initialize chat 210 based on a direct request from a user to the computer telephony interface 110. Inbound communications may include, without limitation, phone calls (packet switched telephone network (PSTN) communications), Voice over Internet Protocol (VoIP) communications received either over a computer network or through a PSTN and the like. Reference will be made within this application to calls as the inbound communication. This is not meant to be limiting in any manner, as calls is meant to incorporate any of the above communications methods.

The communications processing module, through the operations described here, processes the alert to initialize chat 210 by routing it to an agent. This may include a single agent or group of agents. In the latter, the first agent that is available could respond to the user. Routing the alert to initialize chat 210 may include a decision as to which agent or group of agents should service the call. This may be done, in some examples, using just the identified, or present, need of the user. In further examples, the present need may be combined with one or more unidentified needs, and both used in combination to select, or decide, which agent should service the call. Various embodiments provide an alert 206 only while a usage pattern is detected, and disable the alert after it is no longer detected.

Figure 3:
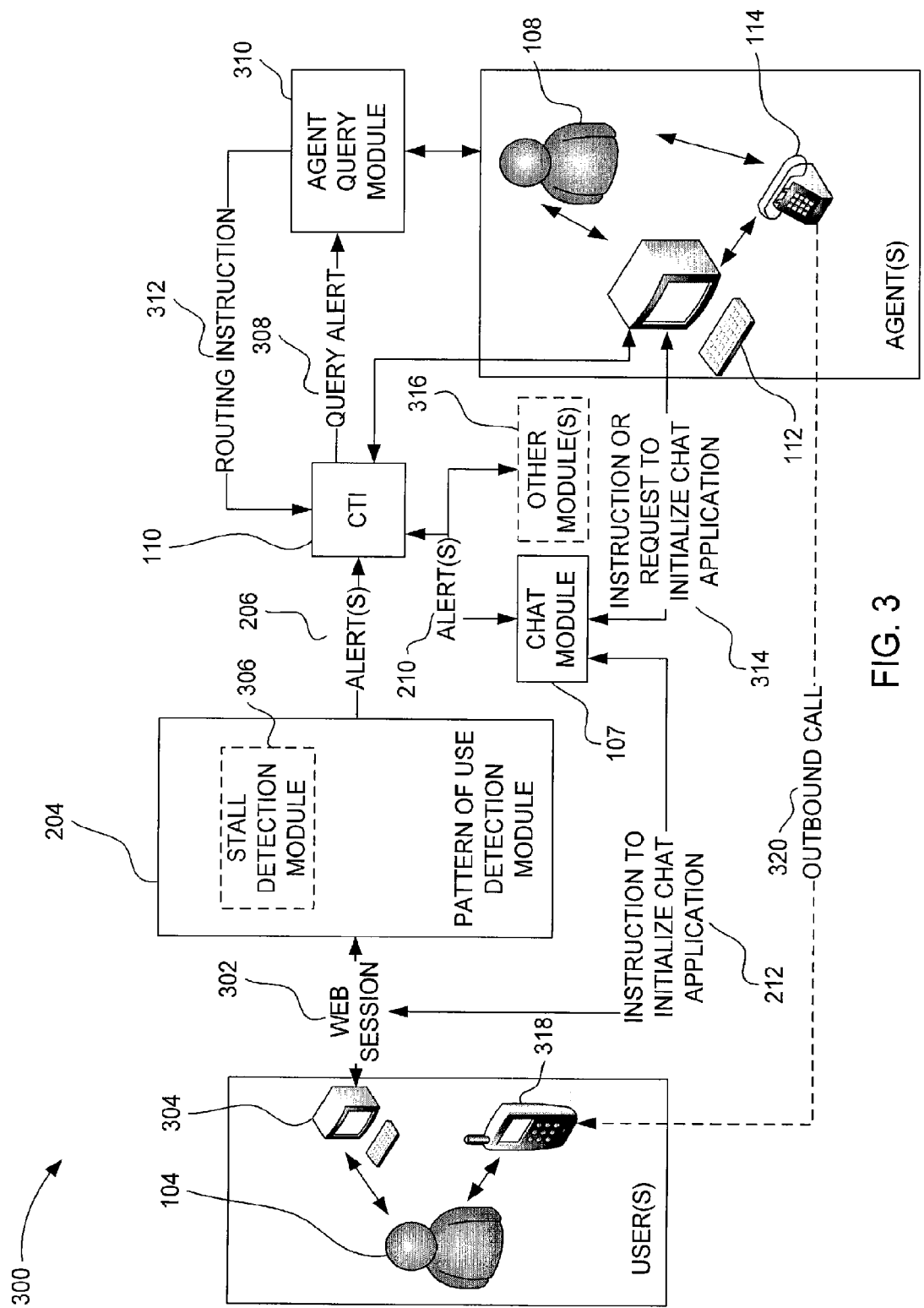
FIG. 3 shows a more detailed diagram of a system for establishing communications, in accordance with some example embodiments.

FIG. 3 shows a more detailed diagram of an apparatus for establishing communications, in accordance with some example embodiments. In various embodiments, a web session 302 includes network based communications between a user and a computer of a provider. The computer of the provider can include a web server, in some embodiments. In various embodiments, the communications take place between a computing device of the user 304 (e.g., a desktop personal computer), and a computer of the provider.

In various embodiments, a pattern of use detection module 204 participates in the web session 302. In some embodiments, the pattern detection module is software or a computing device which is installed locally to a user site. For example, in some embodiments, the pattern of use detection module 204 includes software installed on a personal computer of the user. In additional embodiments, the pattern of use detection module 204 includes software or a computer device which installed at a provider location. This could include installation of software onto a content management module (e.g., a web server), and it could include installation of a device having bidirectional communication with such a content management module.

In various embodiments, the pattern of use detection module 204 optionally includes a stall detection module 306. A stall detection module 306 can measure user inactivity and compare it to a specified time, in some examples. In additional examples, a stall detection module 306 can measure the number of clicks by a user to a particular website, without progressing to a specified website. The stall detection module 306 can function as part of the pattern of use detection module 204, or can be add-on software or hardware which is in communication with the pattern of use detection module 204.

In various embodiments, the pattern of use detection module 204 provides alert(s) 206. Alert(s) 206 can include inactivity information, user clicks without reaching a specified webpage, or other information about how a user interacts with a provider website.

In various embodiments, the alert(s) 206 are provided to a computer telephony interface (CTI) 110. The CTI 110, in various embodiments, sends a query alert 308 to an agent query module 310. The agent query 310 is configured to monitor one or more agents 108 to find an available agent. Information derived from such a query is included in routing instruction 312. Routing instruction can include an instruction to the CTI 110 to provide an alert 210 to chat module 107 to provide instruction or a request to initialize a chat application 314 to a particular agent system 112. In embodiments where an agent is selected by the CTI 110, but is busy, a request is provided to system 112. In embodiments where the agent is not busy, an instruction or a request to initialize a chat application is provided. Various embodiments include an instruction to the CTI 110 to deliver instructions to initialize a chat application 212, such instructions being based on the knowledge than an agent is ready to chat. Various embodiments provide an alert 210 to one or more additional modules 316. Such modules are described in the text associated with FIG. 5.

Various embodiments are optionally configured to use the agent query module 310 to determine if an agent 108 is available to administer an outbound call 320. In some embodiments, a user is provided with an invitation to receive an outbound call. Upon receiving a response back indicating that the user is interested in receiving an outbound call, the system 300 optionally places a call to a telephone 318 of the user. In some embodiment, the CTI 110 determines, based on the alert 206, and in some cases stored data which is compared to pattern of use data, that the user should be called even without an invitation response from the user. In some embodiments, it is determined that an agent should call the user, but there are no available agents. In some of these embodiments, an outbound call 320 is instead queued until an agent becomes available.

Some embodiments detect a user response to the real-time chat communication invitation; and automatically initializing a real-time chat communication from the computer telephony interface to the user only if the user response indicates to initialize such a voice communication.

In some embodiments, the computer telephony interface 110 is configured to receive an alert 206 from a user. As discussed above, the alert 206 may take many forms. The computer telephony interface 110 is configured to receive the alert 206 using any suitable communications method, either singly or in combination, including input from a telephone keypad. In such examples, a chat could begin based on a telephone input from a user.

In some embodiments, the agent query 310 is configured to select an agent to process the alert(s) 206. In a further embodiment, the agent query 310 selects the agent using a present need and one or more unidentified needs of the user. Routing instruction 312 may include an address of the agent. The address includes any suitable destination address as used by the previously discussed communications methods. For instance, in the case of PSTN communication, the address would include a telephone number. In the case of VoIP communications, it may include a telephone interface, such as that used by a PSTN system, or an Internet Protocol (IP) address.

In some embodiments, the instructions received from the agent query module are passed to the CTI 110, wherein the CTI 110 will route alert(s) 210 to selected modules. The agent query 310, in some examples, processes information associated with the user that is suitable for determining the one or more unidentified needs of the user. The information suitable for determining the one or more unidentified needs of the user includes, without limitation, life events experienced by the user, status of financial accounts held by the user, age of the user, marital status of the user, number or presence of children, products or services not utilized by the user, products or services utilized by the user, and the like. This is not meant to be an exhaustive list, and is only meant to be illustrative. As used herein, any information that indicates a possible need for one or more financial or insurance products or services is considered to be within the scope of the present discussion.

In a further embodiment, the agent query module 310 is configured to receive a user identification from the computer telephony interface 110 and query a user data storage module, which maintains data that can be used to determine the one or more unidentified needs of the user. This user data storage module may be a user profile data storage module, in some examples, and may incorporate direct information, or third party information, either individually or in combination. Direct information, as used herein, is meant to include any information obtained by the operator of the chat module 107 or another medium as a result of a business relationship between the operator and the user. This may include, without limitation, past product or service purchases, lending or credit history, demographic information, product or service utilization, credit rating, and the like. Third party information, as used herein, is meant to include any information that the operator obtains regarding the user from sources other than the user. This may include, without limitation, product or service purchase history, user information, and the like. This information may be obtained with the user's consent, in some examples. However information obtained without the express consent of the user may also be stored within the user data storage module. The direct or third party information may be specific to the user, or about one or more groupings associated with the user.

Information specific to the user includes information that is unique to the user, and includes individual account status, marital status, age, and the like. Information about one or more groupings includes what is referred to as demographic information. This is general information that can be used to model the needs of the user. For example, if the user is 95 years old, general information about retired persons could be included. Using this type of demographic information, generalities and assumptions about the user can be made. However, this information is not as valuable in some arrangements as specific information because assumptions and generalities do not take into account the individual user. For instance, in the example of a user who is 95, they may in fact be employed full-time and have different needs than someone who is 95 and retired.

In a further embodiment, the user data storage module can store, in addition to the information described above, one or more unidentified needs of the user. In such an example, the agent query 310 queries the user data storage module for such information and then modifies the alert(s) 206 to include such information, and selects an agent accordingly. This may include, without limitation, an agent that is capable of attending to all of those needs, or to a majority of those needs. It may also include an agent that can only respond to the present need, but is versed and knowledgeable about the one or more unidentified needs, though not capable of attending to them. One example of this is an agent who is knowledgeable about all products that a company offers, which may include investment opportunities. However, only licensed representatives can attend to investment needs, as required by federal regulations. In this example, the agent can inform the user about the investment offerings of the company, but will have to transfer that call to another agent for further processing.

Figure 4:
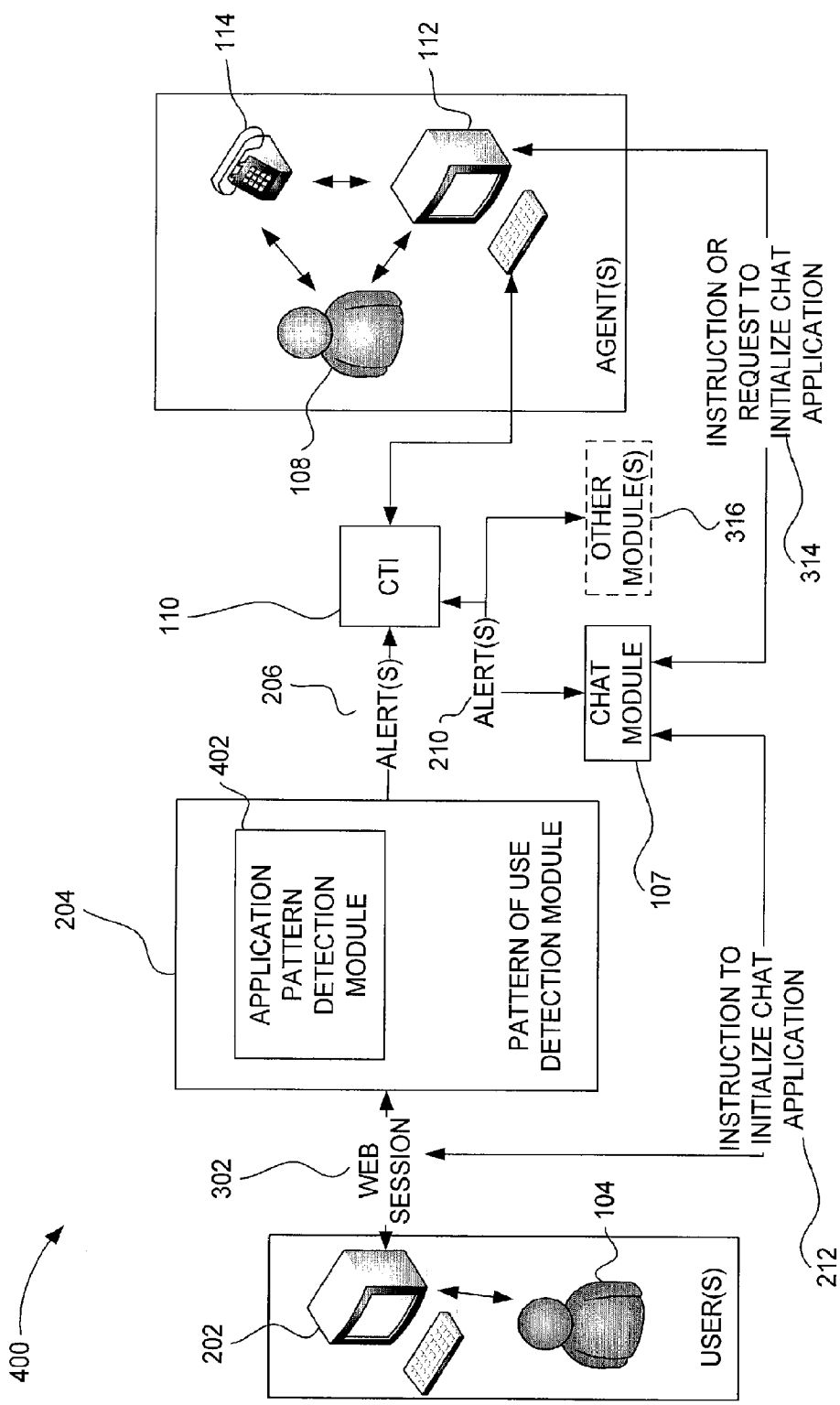
FIG. 4 shows a more detailed diagram of a system for establishing communications, in accordance with some example embodiments.

FIG. 4 shows a more detailed diagram of an apparatus for establishing communications, in accordance with some example embodiments. Included in the illustration is an application pattern detection module 402. In various embodiments, system 400 provides at least one service to a web-enabled user. In various embodiments, the service requires a multi-field or multi-page application. In some embodiments, the multi-field or multi-page which is web-accessible, although embodiments which are accessible over other communication mediums, such as telephone networks, are included. In various embodiments, the user is able to switch between at least a first application page and a second application page. In some of these embodiments, the application pattern detection module 402 detects an application pattern related to a plurality of web-based user responses to queries provided as part of the multi-page application. In various embodiments, the alert(s) 206 are based on what patterns the application pattern detection module 402 detects. In some embodiments, the CTI 110 compares patterns from the application pattern detection module 402 to specified user patterns.

Various embodiments include querying the user through the real-time chat application for information related to at least one query of the multi-page application. Some embodiments include providing the user with instructions related to the at least one query using the real-time chat application.

Some embodiments include completing at least a portion of the application by collecting information from the user over a voice communication between the user and an agent connected to the computer telephony interface. Some embodiments automatically send a real-time chat communication invitation when the user reaches the particular application page.

In some embodiments, a system queries availability of an agent (e.g., using agent query module 310 illustrated in FIG. 3) using the computer telephony interface while the user accesses the first application page and reserving the agent until the user response to the real-time chat communication invitation is detected.

Figure 5:
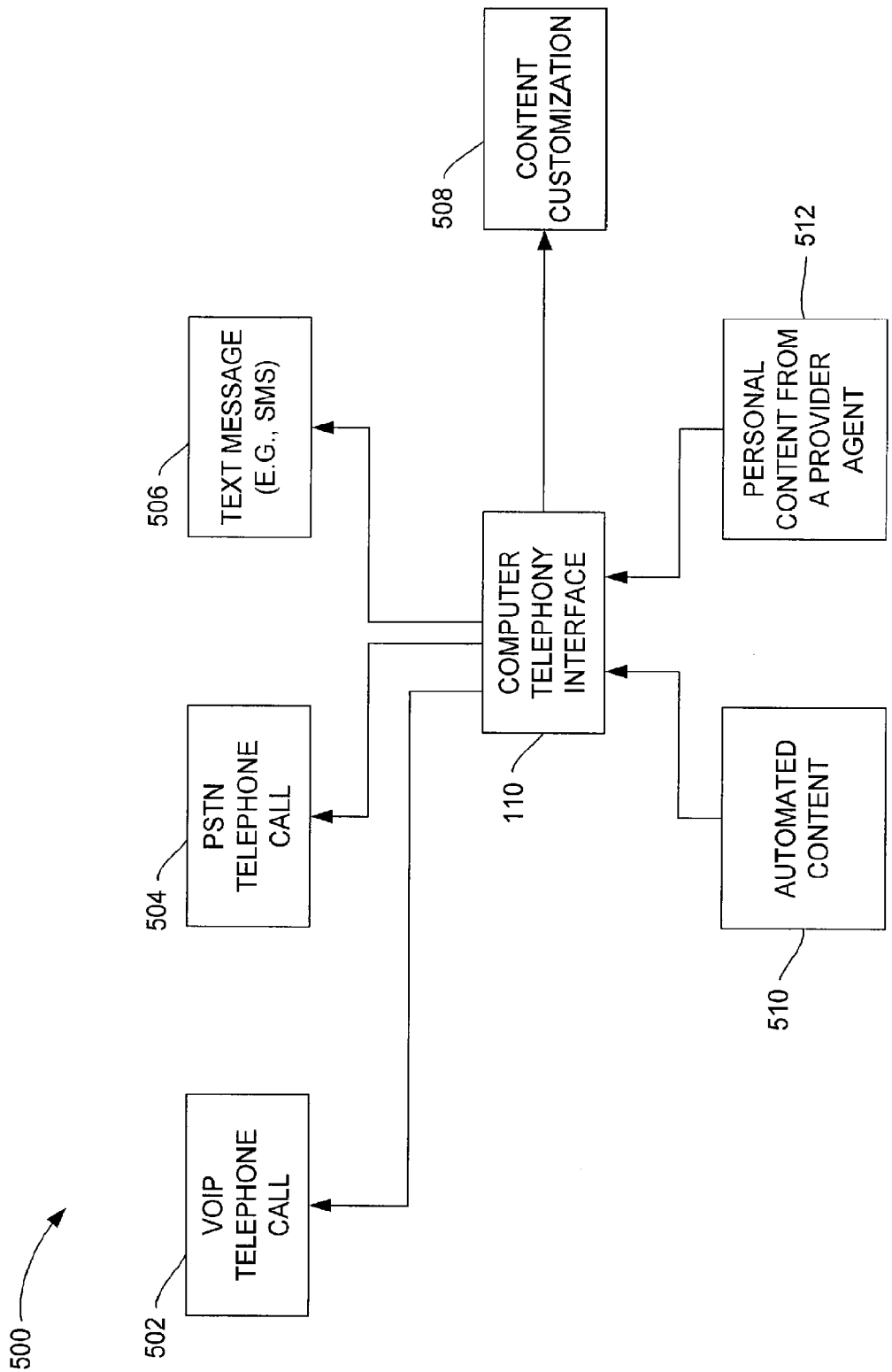
FIG. 5 shows various devices for establishing communication, according to various embodiments.

FIG. 5 illustrates a system 500 including several modules, according to embodiments of the present subject. Such modules can establish communication between a user and an agent. The present subject matter includes, but is not limited to, modules such as a voice over internet protocol (VoIP) module 502, a packet switched telephone network (PSTN) module 504 and a text message module 506, which includes short messaging service (SMS) components in come embodiments. 3.

Various embodiments include sending a communication invitation prior to initializing a communication. For example, some embodiments include sending a voice communication invitation prior to initializing a voice communication network between the agent and the user. Some of these examples include detecting a user response to the voice communication invitation. Some examples automatically initializing a voice communication network between the agent and the occurs only if the user response indicates to initialize such a voice communication.

Finally, some embodiments provide for content customization 508, such as providing for alterations to content on a content management module (e.g., content management module 102 illustrated in FIG. 1). For example, if the CTI 110 determines that a user speaks Spanish, it can provide content customization information 508 to a content management module 102 to change content to better provide for persons who would prefer to speak Spanish.

In various embodiments, the information provided by one or more of these modules can include automated content 510, such as a recorded message, or can include personal content from a provider agent 512 such as conversation relating to a service.

Methods

Figure 6:
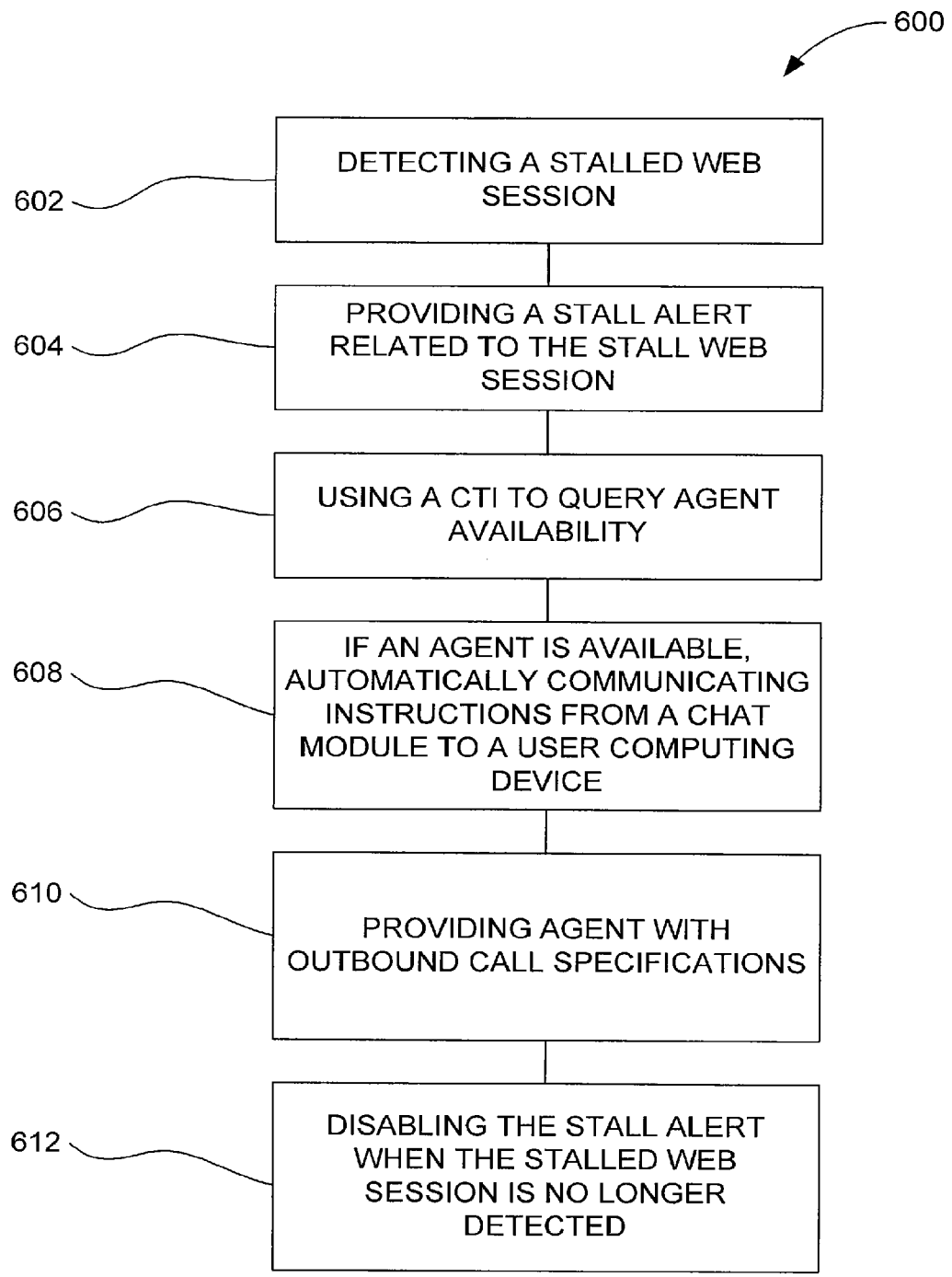
FIG. 6 shows a flowchart of a method for establishing communications, in accordance with some example embodiments.

FIG. 6 shows a flowchart of a method 600 for establishing communications, in accordance with some example embodiments. Various embodiments include a method which includes providing at least one service to a web-enabled user. At 602, the method includes detecting a stalled web session related to the user accessing the at least one service. At 604, the method includes providing a stall alert to a computer telephony interface, the stall alert based on the stalled web session. The stall alert can additionally be based on a direct telephone communication by the user to the computer telephony interface. In today's phone systems, this may take the form of "please press 2 if you need help with a banking product." In today's systems, the inbound communication is routed to a banking representative. Using the systems and methods described herein, the communication can be routed to an agent who is equipped to handle that need as well as others.

At 606, in response to the stall alert, the method includes using a computer telephony interface to automatically query availability of an agent having access to a computer telephony interface. At 608, if the query determines an agent is available, the method includes automatically communicating instructions from a real-time chat module in communication with the computer telephony interface to a computing device operated by the user, the instructions to initialize a real-time chat application executed on the computing device. In various embodiments, the agent provides resolution of an issue for the user. For example, if a present need is to pay a current amount due on a credit card, the selected agent would be capable of receiving payment for the amount due using the chat application. Additional services could be provided as well, including informing the user about life insurance offers. Some embodiments provide such information without prompt from the user.

At 610, the method includes providing the agent with outbound call specifications related to the user. At 612, the method includes disabling the stall alert when the stalled web session is no longer detected.

Various examples include agents which are capable of responding to more than one need of a user. Some examples include agents that are specifically tasked with interacting with users that are at risk for termination of products or services. This may include, without limitation, new users, users who only use one product or service, or users that are having trouble meeting one or more financial obligations. Each of these users may require special handling. In some cases, special applications are required, which are not initially presented to the user. In various examples, care can be taken to try and afford more services to the user. In various examples, an agent may have additional training to deal more effectively with the user. This may include increased training with regards to debt counseling. By assisting the user with their obligations, the risk of default is reduced. Further, by assisting the user now with their problems, the possibility that they will be a long term user is also increased.

Figure 7:
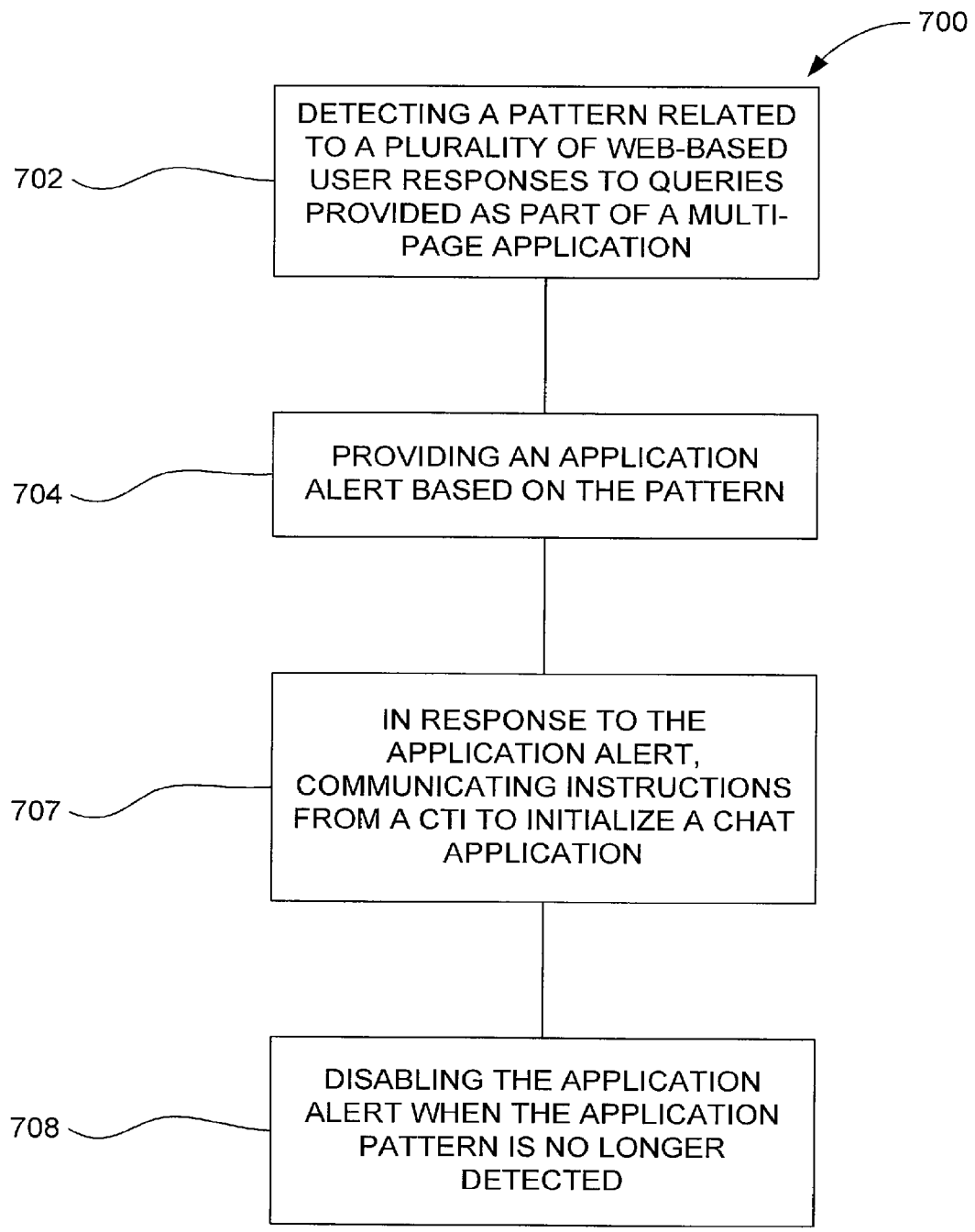
FIG. 7 shows a flowchart of a method for establishing communications, in accordance with some example embodiments.

FIG. 7 shows a flowchart of a method 700 for establishing communications, in accordance with some example embodiments. The method includes providing at least one service to a web-enabled user, the service requiring a multi-page application which is web-accessible, with the user being able to switch between at least a first application page and a second application page. At 702, the method includes detecting an application pattern related to a plurality of web-based user responses to queries provided as part of the multi-page application.

At 704, the method includes providing an application alert to a computer telephony interface, the application alert based on the application pattern. At 706, in response to the application alert, communicating instructions from the computer telephony interface to a computing device operated by the user, the instructions to initialize a real-time chat application executed on the computing device. At 708, the method includes disabling the application alert when the application pattern is no longer detected.

Figure 8:
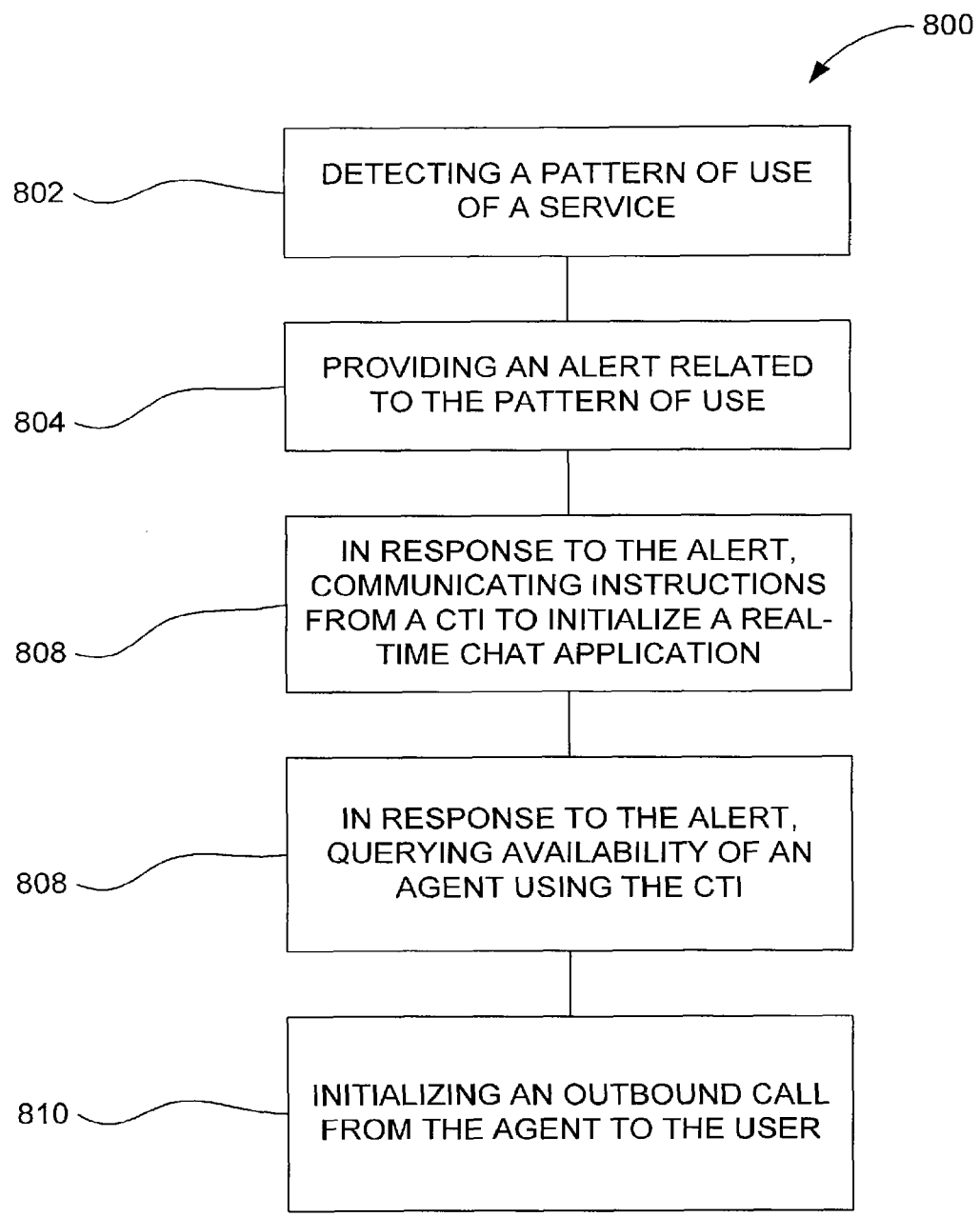
FIG. 8 shows a flowchart of a method for establishing communications, in accordance with some example embodiments.

FIG. 8 shows a flowchart of a method 800 for establishing communications, in accordance with some example embodiments. The method includes providing at least one service to a web-enabled user. At 802, the method includes detecting a pattern of use related to the user accessing the at least one service. At 804, in response to the pattern of use, the method includes providing an alert to a computer telephony interface. At 806, in response to the alert, the method includes communicating instructions from the computer telephony interface to a computing device operated by the user, the instructions to initialize a real-time chat application executed on the computing device. At 808, in response to the alert, the method includes automatically querying availability of an agent using the computer telephony interface. In some cases, the service of interest may require an interaction with an agent licensed by a regulatory agency to perform those operations. One example, without limitation, is investment needs. In such a situation, the agent selected would be an agent that was licensed to respond to the need that requires licensing. In some situations, the licensure requirement may be satisfied by licensing the computing system operated by the agent. In such an arrangement, the agent themselves would not be licensed, but by operating a licensed computing system, they can respond to and service that interest, or need, of the user.

At 810, if the query determines an agent is available, the method includes automatically initializing an outbound call from the agent to the user.

By adding more products and services, the integration into the life of the user becomes more pervasive and their risk for leaving decreases. Other services and products can be offered to the user on a regular basis, again integrating more into the life of the user.

Examples

Figure 9:
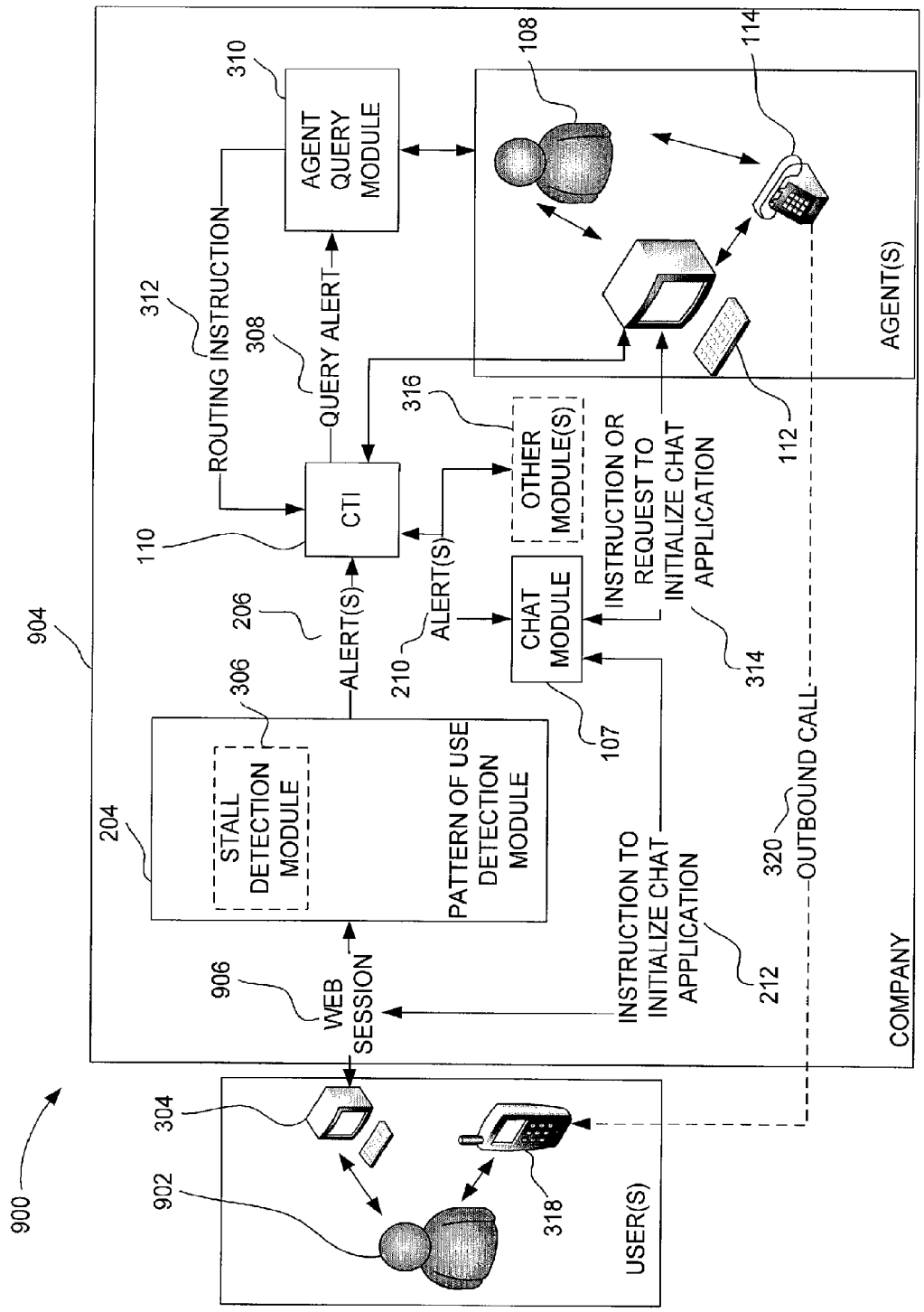
FIG. 9 shows an example of a system for establishing communication, according to some examples.

FIG. 9 shows a diagram of establishing communications, in accordance with some example embodiments. The systems depicted in FIG. 9 and the operations described here are an example implementation of the systems and methods described above. In this example, a user 902 is logging on to obtain auto insurance for a newly purchased van. The system and operations shown here have equal applicability to any variety of services that may require interaction with an agent. This may include, as well, a manufacturing company that offers support for new users.

The user 902 logs on to the company 904 to get insurance for an automobile. This may include a user that has current auto insurance and is merely adding a new vehicle to their policy. It may also include a potential new user who is comparing insurance offerings of many service providers. In the latter example, it is advantageous to try and sell more than just a single product or service to that user. By selling more than one product or service, the likelihood of keeping that user long-term is increased. However, the systems and methods described above and further explained here by way of example, are equally applicable in both situations.

The communication received from the user is received over a web session 906. The communication is received at a pattern of use detection module 204. The chat module 107 may be coupled to a CTI 110, in some examples. In various examples, the CTI 110 is configured to pass incoming communications to a chat module 107 to send an alert to the chat module 107. The chat module is configured to provide instructions to initialize a chat application both to the user and to an agent, the chat applications in communication with one another.

In the example shown in FIG. 9, the chat module 107, CTI 110 and the one or more agents 108 are all operated by a single company, or business. This is just one arrangement, however, and the methods and systems described are not restricted to just such an arrangement. For example, separate service providers may provide each of the components depicted in FIG. 9.

Each of the agents interacts with the user 902 through a CTI 110 or an agent system 112, or both, where the telephone interface 114 is communicatively coupled to the CTI 110 through the agent system 112. The agent system 112 may also provide to the agent 108 the ability to service the present and one or more unidentified needs of the user 902. In such an example, the agent system 112 may be additionally coupled to other computing systems and devices.

Figure 10:
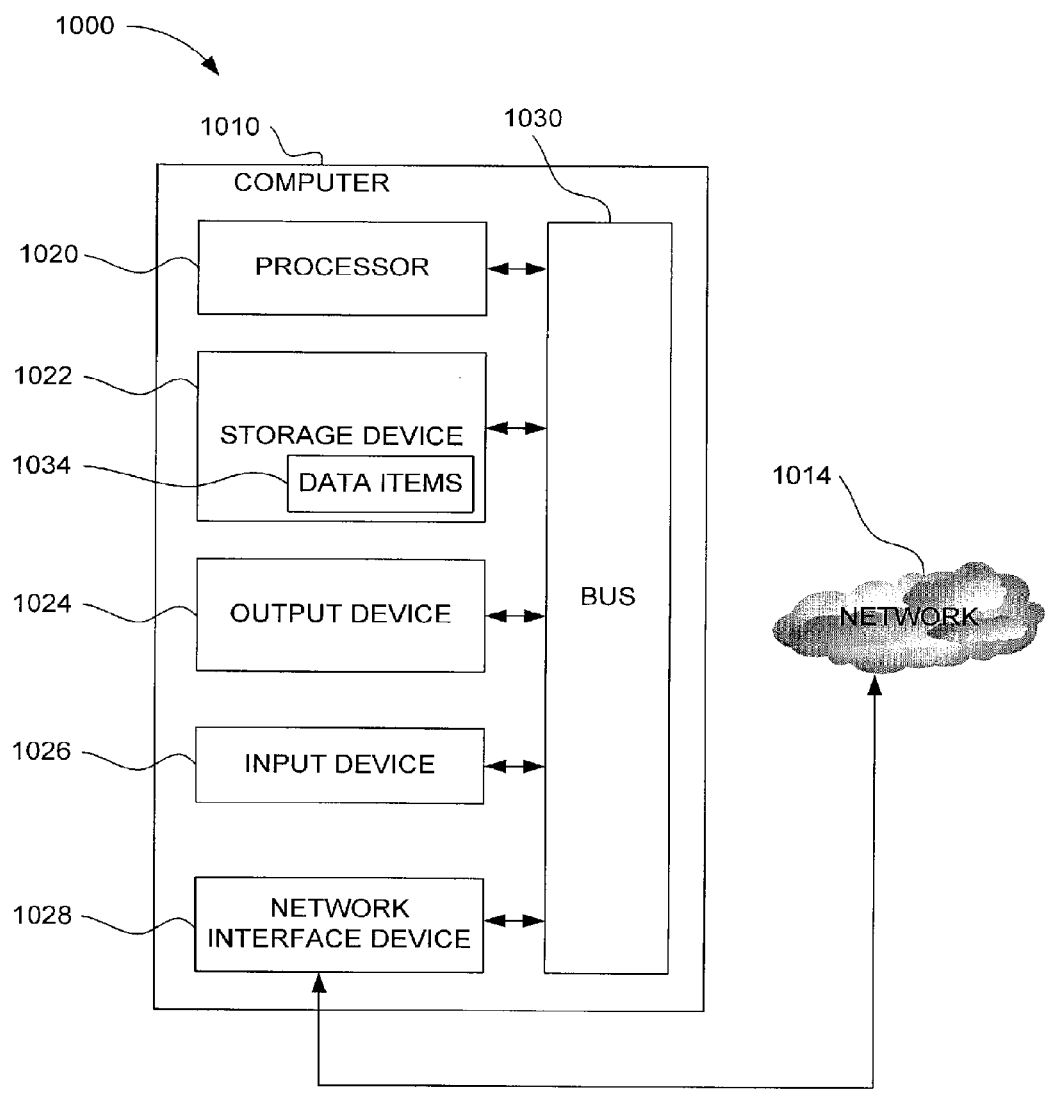
FIG. 10 shows a diagram of a machine including instructions to perform any one or more of the methodologies described herein.

FIG. 10 shows a diagram of a machine including instructions to perform any one or more of the methodologies described herein. A system 1000 includes a computer 1010 connected to a network 1014. The computer 1010 includes a processor 1020, a storage device 1022, an output device 1024, an input device 1026, and a network interface device 1028, all connected via a bus 1030. The processor 1020 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1020 executes instructions and includes that portion of the computer 1010 that controls the operation of the entire computer. Although not depicted in FIG. 10, the processor 1020 typically includes a control unit that organizes data and program storage in memory and transfers data and other information between the various parts of the computer 1010. The processor 1020 receives input data from the input device 1026 and the network 1014 reads and stores code and data in the storage device 1022 and presents data to the output device 1024.

Although the computer 1010 is shown to contain only a single processor 1020 and a single bus 1030, the disclosed embodiment applies equally to computers that may have multiple processors and to computers that may have multiple busses with some or all performing different functions in different ways.

The storage device 1022 represents one or more mechanisms for storing data. For example, the storage device 1022 may include read-only memory (ROM), random access memory (RAM), magnetic disk storage media, optical storage media, flash memory devices, and/or other machine-readable media. In other embodiments, any appropriate type of storage device may be used. Although only one storage device 1022 is shown, multiple storage devices and multiple types of storage devices may be present. Further, although the computer 1010 is drawn to contain the storage device 1022, it may be distributed across other computers, for example on a server.

The storage device 1022 includes a controller (not shown in FIG. 10) and data items 1034. The controller includes instructions capable of being executed on the processor 1020 to carry out the functions, as previously described above with reference to FIGS. 1-9. In another embodiment, some or all of the functions are carried out via hardware in lieu of a processor-based system. In some embodiments, the controller is a web browser, but in other embodiments the controller may be a database system, a file system, an electronic mail system, a media manager, an image manager, or may include any other functions capable of accessing data items. Of course, the storage device 1022 may also contain additional software and data (not shown), which is not necessary to understand the invention.

Although the controller and the data items 1034 are shown to be within the storage device 1022 in the computer 1010, some or all of them may be distributed across other systems, for example on a server and accessed via the network 1014.

The output device 1024 is that part of the computer 1010 that displays output to the user. The output device 1024 may be a liquid crystal display (LCD) well-known in the art of computer hardware. But, in other embodiments the output device 1024 may be replaced with a gas or plasma-based flat-panel display or a traditional cathode-ray tube (CRT) display. In still other embodiments, any appropriate display device may be used. Although only one output device 1024 is shown, in other embodiments any number of output devices of different types, or of the same type, may be present. In some embodiments, the output device 1024 displays a user interface.

The input device 1026 may be a keyboard, mouse or other pointing device, trackball, touchpad, touch screen, keypad, microphone, voice recognition device, or any other appropriate mechanism for the user to input data to the computer 1010 and manipulate the user interface previously discussed. Although only one input device 1026 is shown, in another embodiment any number and type of input devices may be present.

The network interface device 1028 provides connectivity from the computer 1010 to the network 1014 through any suitable communications protocol. The network interface device 1028 sends and receives data items from the network 1014.

The bus 1030 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 1010 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 1010. For example, other peripheral devices such as audio adapters or chip programming devices, such as EPROM (Erasable Programmable Read-Only Memory) programming devices may be used in addition to, or in place of, the hardware already depicted.

The network 1014 may be any suitable network and may support any appropriate protocol suitable for communication to the computer 1010. In some embodiments, the network 1014 may support wireless communications. In another embodiment, the network 1014 may support hard-wired communications, such as a telephone line or cable. In another embodiment, the network 1014 may support the Ethernet IEEE (Institute of Electrical and Electronics Engineers) 802.3x specification. In another embodiment, the network 1014 may be the Internet and may support IP (Internet Protocol). In another embodiment, the network 1014 may be a local area network (LAN) or a wide area network (WAN). In another embodiment, the network 1014 may be a hotspot service provider network. In another embodiment, the network 1014 may be an intranet. In another embodiment, the network 1014 may be a GPRS (General Packet Radio Service) network. In another embodiment, the network 1014 may be any appropriate cellular data network or cell-based radio network technology. In another embodiment, the network 1014 may be an IEEE 802.11 wireless network. In still another embodiment, the network 1014 may be any suitable network or combination of networks. Although one network 1014 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method for providing at least one service to a user that is web-enabled, the method comprising:
   detecting, by a computer, a pattern of use related to the user accessing the at least one service;
   matching, by the computer, the pattern of use related to the user accessing the at least one service to the user in a database;
   automatically querying availability of an agent operating a computer executing a computer telephony interface (CTI) application in response to identifying the pattern of use of the user requesting the at least one service; and
   communicating, by the computer, instructions to a computing device operated by the user in response to identifying the pattern of use, the instructions containing an invitation for the computing device of the user to initialize a real-time chat application to be executed on the computing device; and
   automatically initializing, by the computer, a voice communication networked connection between the computer of the agent and computing device of the user, upon receiving a request for the voice communication networked connection in response to the real-time chat invitation.

2. The method of claim 1, further comprising:
   detecting a user response to the real-time chat invitation.

3. The method of claim 1, wherein the service is at least partially administered by a first web-server with the first web-server including a pattern detection application, and wherein the first web-server provides the alert to the CTI.

4. The method of claim 1, wherein detecting the pattern of use further comprises receiving an indicator of a user interaction with the at least one service from a pattern detection application associated with the computing device operated by the user to detect the pattern of use.

5. The method of claim 4, wherein recognizing a pattern includes detecting a stalled web session related to the at least one service.

6. A computer-implemented method for providing at least one service to a user that is web-enabled, the method comprising:
   detecting, by a computer, a pattern of use related to the user accessing the at least one service;
   matching, by the computer, the pattern of use related to the user accessing the at least one service to the user in a database;
   automatically querying availability of an agent operating a computer executing a computer telephony interface (CTI) application in response to identifying the pattern of use of the user requesting the at least one service; and
   when the query determines an agent is available, sending a voice communication invitation to the user; and
   automatically initializing an outbound call by the CTI application from the computer of the agent to a computing device of the user based upon a user response received from the user.

7. The method of claim 6, further comprising:
   detecting the user response to the voice communication invitation; and
   upon receiving a request for a call with the agent in the user response to the voice communication invitation, automatically initializing a voice communication network between the agent and the user.

8. The method of claim 6, further comprising:
    detecting the user response to the voice communication invitation; and
    upon receiving a request for a real-time chat with the agent in the user response to the voice communication invitation, automatically initializing a real-time chat application between the agent and the user.

9. The method of claim 6, wherein the service is at least partially administered by a first web-server with the first web-server including a pattern detection application, and wherein the first web-server provides the alert to the CTI.

10. The method of claim 6, wherein detecting the pattern of use further comprises receiving an indicator of an interaction with the at least one service from a pattern detection application associated with the computing device of the user to detect the pattern of use.

11. The method of claim 10, wherein recognizing a pattern includes detecting a stalled web session related to the at least one service.

12. The method of claim 6, wherein the outbound call is transported packet switched telephone network (PSTN) coupled to the CTI.

13. The method of claim 12, wherein the outbound call includes communication over a voice over internet protocol (VoIP) network.

14. A system for processing at least one service to a user that is web-enabled, the system comprising:
    one or more processors programmed by computer program instructions to:
        detect a pattern of use related to the user accessing the at least one service;
        matching the pattern of use related to the user accessing the at least one service to the user in a database;
        automatically querying availability of an agent operating a computer executing a computer telephony interface (CTI) application in response to identifying the pattern of use of the user requesting the at least one service; and
        communicate instructions to a computing device operated by the user in response to identifying the pattern of use, the instructions containing an invitation for a computing device of the user to initialize a real-time chat application to be executed on the computing device; and
    automatically initialize a voice communication networked connection between the computer of the agent and the computing device of the user, upon receiving a request for the voice communication networked connection in response to the real-time chat invitation.

15. The system of claim 14, wherein the processor is further configured to:
    detect a user response to the real-time chat invitation.

16. The system of claim 14, wherein the service is at least partially administered by a first web-server with the first web-server including a pattern detection application, and wherein the first web-server provides the alert to the CTI.

17. The system of claim 14, detecting the pattern of use further comprises receiving an indicator of an interaction with the at least one service from a pattern detection application associated with the computing device operated by the user to detect the pattern of use.

18. The system of claim 17, wherein recognizing a pattern includes detecting a stalled web session related to the at least one service.

19. A system for processing at least one service to a user that is web-enabled, the system comprising:
    one or more processors programmed by computer program instructions to:
        detect a pattern of use related to the user accessing the at least one service, according to the at least one service accessed by the user indicated by a database that identifies each of the at least one service accessed by the user;
        automatically query availability of an agent operating a computer executing a computer telephony interface (CTI) application in response to identifying the pattern of the user of the user requesting the at least one service; and
    when the query determines an agent is available, send a voice communication invitation to the user; and
    automatically initialize an outbound call from the CTI application executed by the computer of the agent to a computing device of the user based upon a user response received from the computing device of the user.

20. The system of claim 19, wherein the processor is further configured to:
    detect the user response to the voice communication invitation; and
    upon receiving a request for a call with the agent in the user response to the voice communication invitation, automatically initializing a voice communication network between the agent and the user.

21. The system of claim 19, wherein the processor is further configured to:
    detect the user response to the voice communication invitation; and
    upon receiving a request for a real-time chat with the agent in the user response to the voice communication invitation, automatically initializing a real-time chat application between the agent and the user.

22. The system of claim 19, wherein the service is at least partially administered by a first web-server with the first web-server including a pattern detection application, and wherein the first web-server provides the alert to the CTI.

23. The system of claim 19, wherein the one or more processors are further programmed to detect the pattern of use based upon receiving an indicator of an interaction with each of the at least one service received from a pattern detection application executed by the computing device of the user to detect the pattern of use.

24. The system of claim 23, wherein recognizing a pattern includes detecting a stalled web session related to the at least one service.

25. The system of claim 19, wherein the outbound call is transported packet switched telephone network (PSTN) coupled to the CTI.

26. The system of claim 25, wherein the outbound call includes communication over a voice over internet protocol (VoIP) network.

* * * * *